(12) United States Patent
Esenwein et al.

(10) Patent No.: US 10,631,130 B2
(45) Date of Patent: Apr. 21, 2020

(54) MOBILE FUNCTION DEVICE

(71) Applicant: Robert Bosch GmbH, Stuttgart (DE)

(72) Inventors: Florian Esenwein,
Leinfelden-Echterdingen (DE); Joachim Schadow, Stuttgart (DE); Joern Stock, Wernau (DE); Juergen Wiker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 15/386,092

(22) Filed: Dec. 21, 2016

(65) Prior Publication Data

US 2017/0176973 A1    Jun. 22, 2017

(30) Foreign Application Priority Data

Dec. 21, 2015  (DE) .................. 10 2015 226 196

(51) Int. Cl.
| | |
|---|---|
| *H04W 4/02* | (2018.01) |
| *H04W 4/029* | (2018.01) |
| *H04B 1/3827* | (2015.01) |
| *H04W 4/80* | (2018.01) |
| *H04L 29/08* | (2006.01) |

(52) U.S. Cl.
CPC ............ *H04W 4/026* (2013.01); *H04B 1/385* (2013.01); *H04W 4/029* (2018.02); *H04L 67/12* (2013.01); *H04W 4/02* (2013.01); *H04W 4/80* (2018.02)

(58) Field of Classification Search
CPC .............................. G05B 19/409; H04B 1/385

USPC .......................................................... 700/83
See application file for complete search history.

(56) References Cited

U.S. PATENT DOCUMENTS

| | | | | |
|---|---|---|---|---|
| 6,225,589 B1* | 5/2001 | Bartok | ................... | B23H 7/265 |
| | | | | 219/69.15 |
| 6,490,929 B1* | 12/2002 | Russell | ..................... | G01H 1/00 |
| | | | | 340/683 |

(Continued)

FOREIGN PATENT DOCUMENTS

| | | |
|---|---|---|
| DE | 103 03 006 A1 | 8/2004 |
| DE | 1 702 560 A1 | 9/2006 |

(Continued)

*Primary Examiner* — Carlos R Ortiz Rodriguez
*Assistant Examiner* — Joshua T Sanders
(74) *Attorney, Agent, or Firm* — Maginot, Moore & Beck LLP

(57) ABSTRACT

A mobile function device, in particular a mobile tool-system function device configured to be disposed on an extremity of an operator, includes at least one sensor unit configured to sense at least one emission characteristic quantity and/or at least one position-specific characteristic quantity, and at least one communication unit configured to transmit electronic data to at least one external unit, in particular to a portable power tool and/or to an item of safety clothing. The mobile function device further includes at least one computing unit configured to generate, in dependence on the at least one sensed emission characteristic quantity and/or the at least one sensed position-specific characteristic quantity, electronic data configured to control the at least one external unit by open-loop and/or closed-loop control. The at least one communication unit configured to transmit the generated electronic data to the at least one external unit.

10 Claims, 3 Drawing Sheets

(56) References Cited

U.S. PATENT DOCUMENTS

| | | | | |
|---|---|---|---|---|
| 2005/0000998 A1* | 1/2005 | Grazioli | B25B 27/0085 | |
| | | | | 227/2 |
| 2009/0183992 A1* | 7/2009 | Fredenberg | B81C 99/0085 | |
| | | | | 205/82 |
| 2009/0192723 A1* | 7/2009 | Jonsson | A61B 5/11 | |
| | | | | 702/19 |
| 2014/0379136 A1* | 12/2014 | Schlegel | B25B 21/00 | |
| | | | | 700/275 |
| 2017/0124836 A1* | 5/2017 | Chung | H04W 4/90 | |

FOREIGN PATENT DOCUMENTS

| | | |
|---|---|---|
| DE | 10 2007 010 800 A1 | 9/2008 |
| DE | 10 2013 212 003 A1 | 1/2015 |

* cited by examiner

MOBILE FUNCTION DEVICE

This application claims priority under 35 U.S.C. § 119 to patent application no. DE 10 2015 226 196.4, filed on Dec. 21, 2015 in Germany, the disclosure of which is incorporated herein by reference in its entirety.

BACKGROUND

A mobile function device, which comprises at least one sensor unit, for sensing at least one emission characteristic quantity and/or at least one position-specific characteristic quantity, and at least one communication unit, for transmitting electronic data to at least one external unit, is already known from EP 1 702 560 B 1.

SUMMARY

The disclosure is based on a mobile function device, in particular a mobile tool-system function device that can be disposed on an extremity of an operator, having at least one sensor unit, for sensing at least one emission characteristic quantity and/or at least one position-specific characteristic quantity, and having at least one communication unit, for transmitting electronic data to at least one external unit, in particular to a portable power tool and/or to an item of safety clothing.

It is proposed that the mobile function device comprise at least one computing unit, which is designed to generate, in dependence on at least one sensed emission characteristic quantity and/or at least one sensed position-specific characteristic quantity, electronic data, for controlling the external unit by open-loop and/or closed-loop control, that can be transmitted to the external unit by means of the communication unit. A "computing unit" is to be understood to mean, in particular, a unit constituted by an evaluation unit and/or a control unit. The computing unit may be constituted both by only a processor and by a processor and further electronic components such as, for example, at least one storage means. The computing unit is preferably designed to evaluate at least one emission characteristic quantity and/or position-specific characteristic quantity, sensed by means of the sensor unit, and to determine a state on the basis of the evaluation. For example, values that can be used for an evaluation are stored in a storage means of the computing unit. If, for example, a value of at least one operator-specific characteristic quantity and/or position-specific characteristic quantity, sensed by means of the sensor unit, corresponds to, is below or exceeds a stored value, the computing unit outputs, in particular, at least one electronic signal. "Designed" is to be understood to mean, in particular, specially configured and/or equipped. That an element and/or a unit are/is designed for a particular function is to be understood to mean, in particular, that the element and/or the unit fulfill/fulfills and/or execute/executes this particular function in at least one application state and/or operating state.

A "mobile function device" is to be understood here to mean, in particular, a device that is designed, at least, to output, store, process and/or communicate data, in particular electronic data, and that, in particular, is realized so as to be unattached to a fixed location, such as, for example, realized so as to be movable, drivable, portable, transportable, or the like. An "emission characteristic quantity" is to be understood here to mean, in particular, a characteristic quantity that originates from an external unit, in particular a portable power tool, in particular while work is being performed on a workpiece by means of the external unit, in particular by means of the portable power tool. The emission characteristic quantity may be realized as a sound emission, vibration emission, radiation emission, machining emission (dust, sparks, particles), or as another characteristic quantity considered appropriate by persons skilled in the art.

A "position-specific characteristic quantity" is to be understood here to mean, in particular, a characteristic quantity that defines an orientation in space, a global position, a movement, or the like. The position-specific characteristic quantity may be realized as a cardinal point, as an orientation such as, for example, an inclination relative to a plane or the like, as a global position, or as another position-specific characteristic quantity considered appropriate by persons skilled in the art. The sensor unit preferably comprises at least one position sensor element, which is designed to sense at least one position characteristic quantity, in particular at least one global position characteristic quantity and/or at least one relative work-region position characteristic quantity. The sensor unit preferably comprises at least one position sensor element realized as a GPS sensor element, by means of which a global position of the mobile function device can be sensed. It is also conceivable, however, for the sensor unit to have a different position sensor element, considered appropriate by persons skilled in the art, for sensing a position characteristic quantity realized as a global position, such as, for example, a compass position sensor element, a Galileo position sensor element, a GLONASS position sensor element, a Beidou position sensor element, or the like. Preferably, the sensor unit has at least one sensor element realized as a work-region position sensor element, which is designed, for example by means of a propagation time measurement via a WLAN network or via a mobile telephony network, to enable a relative position of the mobile function device to be identified within a work region, such as, for example, an iBeacon locating element. It is possible, advantageously, to achieve sensing of a position of the mobile function device that, for example in the case of existence of an emergency situation, enables the location of the mobile function device, and thus of the wearer of the mobile function device, to be determined in a reliable manner. It is conceivable that sensing of at least one position characteristic quantity is effected only when a hazard situation is identified. It is conceivable that sensing of at least one position characteristic quantity is deactivated during absence of a hazard situation.

The communication unit is preferably realized as a wireless communication unit. The communication unit may be realized as a WLAN communication unit, as a Bluetooth communication unit, as a radio communication unit, as an RFID communication unit, as an NFC unit, as an infrared communication unit, as a mobile telephony communication unit, as a Zigbee communication unit, or the like. Particularly preferably, the communication unit is designed for bidirectional data transmission. It is also conceivable, however, for the communication unit to be realized, alternatively or additionally, as a wired communication unit such as, for example, a LAN communication unit, a USB communication unit, as a Powerline communication unit, as a CAN-bus Communication unit, as an Ethernet communication unit, as a twisted-pair cable communication unit (CAT5 or CAT6), or the like. The terms "transfer", "transmit" and/or "communicate" are intended here to define, in particular, sending and/or receiving data, in particular electronic data. The communication unit can be used to transmit preferably electronic data between the mobile function device and the external unit, such as, for example, position data, emergency data and/or tripping data from a dead man's monitoring unit or the like. The external unit may be realized, for example, as a portable power tool, as an item of safety clothing, as a smartphone, as a laptop, as a PC, as a tablet PC, as a cloud, as an emergency control centre, as a service control centre, or the like. Preferably, a plausibility check is effected by means of the plausibility unit, taking account of operator-specific characteristic quantities and/or position-specific characteristic quantities, sensed by means of the sensor unit, and electronic data, that can be transmitted from the external unit by means of the communication unit. Advantageously, a reliable comparison of data can be performed, in order to ensure that a situation has been correctly assessed. Erroneous tripping, in particular erroneous tripping of emergency signals, can advantageously be avoided, at least to a very large extent.

Advantageously, the design of the mobile function device according to the disclosure makes it possible to realize, in particular automatic, open-loop and/or closed-loop control of the external unit in dependence on at least one sensed emission characteristic quantity and/or at least one sensed position-specific characteristic quantity. Advantageously, it is possible to achieve a high degree of operator protection against emission burdens.

It is additionally proposed that the at least one sensor unit have at least one vibration sensor element, for sensing at least one emission characteristic quantity realized as a vibration, in particular a vibration acting on an operator wearing the mobile function device on an extremity (arm, leg, or the like), that can be processed by the computing unit for the purpose of generating electronic safety setting data for controlling at least one safety function of the external unit by open-loop and/or closed-loop control. The design according to the disclosure advantageously enables an operator to be protected against being affected by a high vibration dose. Advantageously, a safety function such as, for example, a kick-back safety function, a safety function for counteraction in the case of an uncontrolled blockage or the like of the external unit can be set in a sensitive manner with respect to tripping.

It is additionally proposed that the at least one sensor unit have at least one sound sensor element for sensing at least one emission characteristic quantity realized as sound that can be processed by the computing unit. In particular, an open-loop and/or closed-loop control signal that, for example, limits or reduces a drive output, can be generated by means of the computing unit in dependence on an emission characteristic quantity realized as sound. The design according to the disclosure advantageously enables an operator to be protected against being affected by a high noise burden.

Furthermore, it is proposed that the at least one sensor unit have at least one sensor element for sensing at least one emission characteristic quantity realized as occurring sparks and/or particles that can be processed by the computing unit. The design according to the disclosure advantageously makes it possible to achieve a high degree of operator protection against sparks and/or particles.

Further, it is proposed that the at least one sensor unit have at least one position sensor element for sensing at least one position-specific characteristic quantity realized as an orientation that can be processed by the communication unit. The sensor unit preferably comprises at least one position sensor element that is designed to sense at least one position-specific characteristic quantity realized as a position characteristic quantity, in particular as at least one global position characteristic quantity. The sensor unit preferably comprises at least one position sensor element realized as a GPS sensor element, by means of which a global position of the mobile function device can be sensed. It is also conceivable, however, for the sensor unit to have a different position sensor element, considered appropriate by persons skilled in the art, for sensing a position characteristic quantity realized as a global position, such as, for example, a compass position sensor element, a Galileo position sensor element, a GLONASS position sensor element, a Beidou position sensor element, or the like. Preferably, the sensor unit has at least one sensor element realized as a work-region position sensor element, which is designed, for example by means of a propagation time measurement via a WLAN network or via a mobile telephony network, to enable a relative position of the mobile function device to be identified within a work region, such as, for example, an iBeacon locating element. Advantageously, an orientation of the mobile function device, in particular relative to the external unit, can be sensed. Advantageously, by means of sensing of a position of the mobile function device, it is possible to deduce correct handling and/or orientation of the external unit, such that, for example in the case of incorrect handling and/or orientation, switch-off of the external unit can be realized.

It is additionally proposed that at least one output unit, which is designed to output at least one signal, in particular at least one haptic, optical and/or acoustic signal, in dependence on electronic data generated by means of the computing unit. The output unit may have a display element, a loudspeaker element and/or a vibration element for outputting a signal. The design according to the disclosure makes it possible, advantageously, to realize an output of information that, for example, advantageously informs an operator about open-loop and/or closed-loop control of the external unit by means of the computing unit. An operator can advantageously influence open-loop and/or closed loop control of the external unit by means of the computing unit.

Furthermore, it is proposed that the mobile function device comprise at least one fastening unit at least for fastening the at least one sensor unit to an extremity of an operator. Preferably, the fastening unit comprises at least one arm-band for fastening the at least one sensor unit to an extremity of an operator. Alternatively, however, it is also conceivable for the fastening unit to be provided on an upper part of the body, in particular in a chest region, of an operator for the purpose of fastening the at least one sensor unit. The fastening unit is designed, in particular, to enable at least the sensor unit and the computing unit on an extremity of an operator. Preferably, the sensor unit and the computing unit are disposed, at least partially, in a housing of the mobile function device that is disposed on the fastening unit, or disposed, at least partially, in or on the arm-band of the fastening unit. The design according to the disclosure makes it possible, advantageously, to achieve reliable sensing of emission characteristic quantities and/or position-specific characteristic quantities in direct proximity to the external unit. It is made possible, advantageously, for at least the sensor unit to be easily fastened to an extremity of an operator.

Additionally proposed is a system, in particular a handheld power tool system, having at least one mobile function device according to the disclosure and having at least one external unit, the external unit having at least one safety and/or convenience function that can be controlled by open-loop and/or closed loop control in dependence on electronic data that can be transmitted to the external unit by means of the communication unit of the mobile function device. The external unit is preferably realized as a portable power tool or as an item of safety clothing. A "portable power tool" is to be understood here to mean, in particular, a power tool, for performing work on workpieces, that can be transported by an operator without the use of a transport machine. In particular, the portable power tool has a mass of less than 40 kg, preferably less than 10 kg, and particularly preferably less than 5 kg. The term "item of safety clothing" is intended here to define, in particular, an item of clothing that has at least one passive protective unit and that, in particular, is specially designed to be worn by a wearer during a work operation. A "passive protective unit" is to be understood here to mean, in particular, a protective unit designed to passively protect a wearer, at least against mechanical and/or electrical loads. The item of safety clothing may thus be realized as a work jacket, as a work vest, in particular as a safety vest, as work trousers, as a work shoe, as a safety helmet, as safety glasses, as a work glove, as a work belt, or the like. Preferably, safety and/or convenience functions such as, for example, a kick-back parameter, a maximum torque, a maximum rotational speed, a percussion energy, a protective hood position and/or a ratchet coupling release moment or the like can be controlled by open-loop and/or closed loop control. The safety functions in this case are preferably dependent on a power tool type of the portable power tool. It is also conceivable, however, for the external unit to be of a different design, considered appropriate by persons skilled in the art, such as, for example, designed as a smartphone or the like. Advantageously, in the case of the external unit being designed as a portable power tool, convenient setting of safety functions can be achieved. Moreover, advantageously, a high degree of safety of an operator of a portable power tool can be achieved. Advantageously, operation of portable power tools and/or items of safety clothing can be influenced in dependence on at least one sensed emission characteristic quantity and/or at least one sensed position-specific characteristic quantity. Advantageously, it is possible to achieve safety functions, protective functions, operating parameters of portable power tools and/or items of safety clothing in dependence on operator-specific sensed emissions, and/or influencing of protective functions, in order to adapt the portable power tools and/or the items of safety clothing to operating conditions in an active and/or preventative manner.

Additionally proposed is a method for controlling a safety and/or convenience function of an external unit by open-loop and/or closed loop control by means of a system according to the disclosure, an evaluation of at least one sensed emission characteristic quantity and/or of at least one sensed position-specific characteristic quantity being effected in at least one method step. In a further method step, preferably at least in dependence on the evaluation, an open-loop and/or closed loop control signal is generated, which can be transmitted to the external unit by means of the communication unit. Advantageously, by means of the method according to the disclosure, hazard situations can be reliably identified and an operator can advantageously be protected against hazards. Particularly advantageously, incorrect operation and/or handling of the external unit can be avoided. Particularly advantageously, a method that can provide a high degree of wearer safety can be made available.

The mobile function device according to the disclosure, the system according to the disclosure and/or the method according to the disclosure are/is not intended in this case to be limited to the application and embodiment described above. In particular, the mobile function device according to the disclosure, the system according to the disclosure and/or the method according to the disclosure may have individual elements, components and units, and method steps, that differ in number from a number stated herein, in order to fulfill a principle of function described herein. Moreover, in the case of the value ranges specified in this disclosure, values lying within the stated limits are also to be deemed as disclosed and applicable in any manner.

BRIEF DESCRIPTION OF THE DRAWINGS

Further advantages are disclosed by the following description of the drawing. The drawing shows an exemplary embodiment of the disclosure. The drawing, the description and the claims contain numerous features in combination. Persons skilled in the art will also expediently consider the features individually and combine them to create appropriate further combinations.

There are shown in.

DETAILED DESCRIPTION

Figure 1:
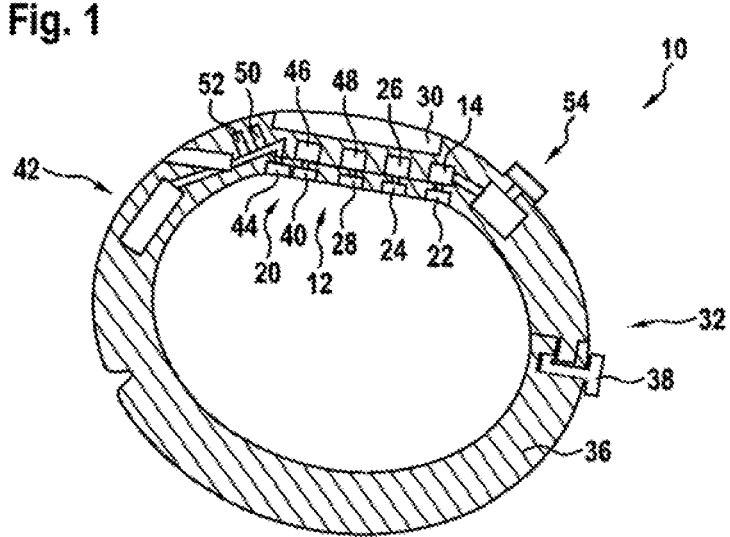
FIG. 1 a sectional view of a mobile function device according to the disclosure, in a schematic representation, FIG. 2 a system according to the disclosure comprising the mobile function device according to the disclosure and a multiplicity of external units, realized as a power tool, which are designed to communicate with the mobile function device, in a schematic representation, FIG. 3 the system according to the disclosure comprising the mobile function device according to the disclosure and a further multiplicity of external units, realized as a portable power tool, which are designed to communicate with the mobile function device, in a schematic representation, FIG. 4 the system according to the disclosure comprising the mobile function device according to the disclosure, comprising at least one external unit realized as a portable power tool, and comprising at least one external unit realized as an item of safety clothing, in an application in a working space, in a schematic representation, and FIG. 5 the system according to the disclosure comprising the mobile function device according to the disclosure, and comprising at least one external unit realized as a smartphone, in a schematic representation.

FIG. 1 shows a sectional view of a mobile function device 10. The mobile function device 10 is realized such that it can be disposed on a part of the body of an operator, in particular on an extremity of an operator (FIGS. 2 to 5). The mobile function device 10 is realized, in particular, as a mobile tool-system function device that can be disposed on an extremity of an operator. The mobile function device 10 is preferably realized as a smartband. The mobile function device 10 is preferably realized such that it can be disposed on an arm of an operator (FIGS. 2 to 5). The mobile function device 10 comprises at least one sensor unit 12, for sensing at least one emission characteristic quantity and/or at least one position-specific characteristic quantity, and at least one communication unit 14, for transmitting electronic data to at least one external unit 16, 18 (FIGS. 2 to 5), in particular to a portable power tool and/or to an item of safety clothing. The mobile function device 10 comprises at least one computing unit 20, which is designed to generate, in dependence on at least one sensed emission characteristic quantity and/or at least one sensed position-specific characteristic quantity, electronic data, for controlling the external unit 16, 18 by open-loop and/or closed-loop control, which can be transmitted to the external unit 16, 18 by means of the communication unit 14 (FIGS. 2 to 5).

The mobile function device 10 comprises at least one fastening unit 32, at least for fastening the at least one sensor unit 12 to an extremity of an operator (FIGS. 2 to 5). The fastening unit 32 has at least one fastening element 36, which is designed to be disposed on the part of the body of an operator. In the exemplary embodiment represented in FIGS. 1 to 5, the fastening element 36 is realized as an arm-band. The fastening element 36 may be realized as an elastic arm-band, as a link arm-band, as a metal arm-band, as a plastic arm-band, or the like. It is also conceivable, however, for the fastening element 36 to be of a different design, considered appropriate by persons skilled in the art, such as, for example, designed as an ankle band, as a chest belt or the like. The fastening unit 32 preferably has at least one closure element 38, which is designed to connect to each other at least two regions of the fastening element 36 that are movable relative to each other, by means of a positive or non-positive connection. The closure element 38 may be of any design considered appropriate by persons skilled in the art, such as, for example, designed as a hook-and-loop closure, as a press-button, as a folding clasp, as a snap-in closure, or the like. The regions of the fastening element 36 that are movable relative to each other are preferably mounted so as to be movable relative to each other by means of a joint or by means of a hinge. The joint or the hinge may be of any design considered appropriate by persons skilled in the art, such as, for example, designed as a film hinge, as a pin hinge, or the like. It is also conceivable, however, for the fastening element 36 to be realized as an elastic arm-band that, as a result of an elastic deformation, can be moved over a hand of an operator and disposed on an arm of an operator. In the case of the fastening element 36 being designed as an elastic arm-band, the fastening unit 32 is preferably realized such that it is separate from the closure element 38 and the joint or the hinge. The sensor unit 12 and/or the computing unit 20 are/is at least partially integrated in the fastening element 36, or at least partially disposed in a housing (not represented in greater detail here) of the mobile function device 10 that can be fixed to the fastening element 36.

The computing unit 20 is preferably designed to evaluate at least one emission characteristic quantity and/or position-specific characteristic quantity sensed by means of the sensor unit 12 and to determine a state on the basis of the evaluation. For example, values that can be used for an evaluation and/or assessment of the at least one emission characteristic quantity and/or position-specific characteristic quantity sensed by means of the sensor unit 12 are stored in a storage means 40 of the computing unit 20. If, for example, a value of at least one emission characteristic quantity and/or position-specific characteristic quantity, sensed by means of the sensor unit 12, corresponds to, is below or exceeds a stored value, the computing unit 20 outputs at least one electronic signal, in particular at least one electronic signal that defines a state. The emission characteristic quantity may be realized as a sound emission, vibration emission, radiation emission, machining emission (dust, sparks, particles), or as another characteristic quantity considered appropriate by persons skilled in the art. The position-specific characteristic quantity may be realized as a cardinal point, as an orientation such as, for example, an inclination relative to a plane or the like, as a global position, or as another position-specific characteristic quantity considered appropriate by persons skilled in the art.

The mobile function device 10 comprises at least one output unit 30, which is designed to output at least one signal, in particular at least one haptic, optical and/or acoustic signal, in dependence on electronic data generated by means of the computing unit 20. By means of the output unit 30, for example, it is possible to output which electronic data can be transmitted to which external unit 16, 18. Advantageously, in the case of an impending hazard, a warning message can be output by means of the output unit 30. Further items of information, considered appropriate by persons skilled in the art, can be output by means of the output unit 30.

For the purpose of energy supply, the mobile function device 10 comprises at least one energy conversion unit 42. The energy conversion unit 42 may be realized as a piezoelectric energy conversion unit, as a solar energy unit, or the like. In the case of the energy conversion unit 42 being designed as a piezoelectric energy conversion unit, it is conceivable for at least one piezoelectric element to be disposed in or on the fastening element 36, and to convert motion energy into electrical energy as a result of a deformation of the fastening element 36. It is conceivable for the piezoelectric energy conversion unit to have a multiplicity of piezoelectric elements, which are disposed in or on the fastening element 36. Alternatively or additionally, the energy conversion unit 42 may be realized as an inductive energy supply unit or as a cable energy supply unit. In addition, the energy conversion unit 42 is connected to an energy storage unit 44 of the mobile function device 10, in a manner already known to persons skilled in the art, by means of an energy supply line (not represented in greater detail here). The energy storage unit 44 is realized, in particular, as a storage battery unit. The energy storage unit 44 may be disposed in a replaceable manner on the fastening unit 32. The energy storage unit 44 preferably comprises at least one backup unit, which is designed to enable basic functions of the mobile function device 10 in an emergency operating mode, such as, for example, output of a message by means of the output unit 30 in the case of a low energy content of the energy storage unit 44, or the like.

The at least one sensor unit 12 has at least one vital-data sensor element 46, for sensing at least one operator-specific characteristic quantity realized as a vital characteristic quantity. The vital-data sensor element 46 may be realized to sense a pulse, a temperature characteristic quantity, in particular a body temperature of an operator, or the like. The sensor unit 12 preferably comprises at least one position sensor element 50, which is designed to sense at least one position characteristic quantity, in particular at least one global position characteristic quantity. Preferably, the sensor unit 12 has at least one work-region position sensor element 52, which is designed, for example by means of a propagation time measurement via a WLAN network or via a mobile telephony network, to enable a relative position of the mobile function device 10 to be identified, in particular within a work region. The work-region position sensor element 52 may be realized, for example, as an iBeacon locating element. Preferably, the sensor unit 12 comprises at least one ambient-temperature sensor element 48, which is designed to sense an ambient temperature, in particular an ambient air temperature.

The at least one sensor unit 12 has at least one vibration sensor element 22, for sensing at least one emission characteristic quantity realized as a vibration that can be processed by the computing unit 20 for the purpose of generating electronic safety setting data for controlling at least one safety function of the external unit 16, 18 by open-loop and/or closed-loop control. The at least one sensor unit 12 has at least one sound sensor element 24, for sensing at least one emission characteristic quantity realized as sound that can be processed by the computing unit 20. The at least one sensor unit 12 has at least one sensor element 26 for sensing at least one emission characteristic quantity realized as occurring sparks and/or particles that can be processed by the computing unit 20. The at least one sensor unit 12 has at least one position sensor element 28, for sensing at least one position-specific characteristic quantity realized as an orientation that can be processed by the computing unit 20. The sensor unit 12 may have further sensor elements, considered appropriate by persons skilled in the art, that are designed to sense at least one operator-specific characteristic quantity and/or at least one position-specific characteristic quantity.

The mobile function device 10 has at least one operating unit 54, by means of which a manual input of open-loop and/or closed loop control signals can be achieved. The operating unit 54 may be realized as a touch-sensitive and/or voice-sensitive unit. The operating unit 54 may be integrated into the output unit 30, or realized so as to be separate from the latter.

Figure 2:
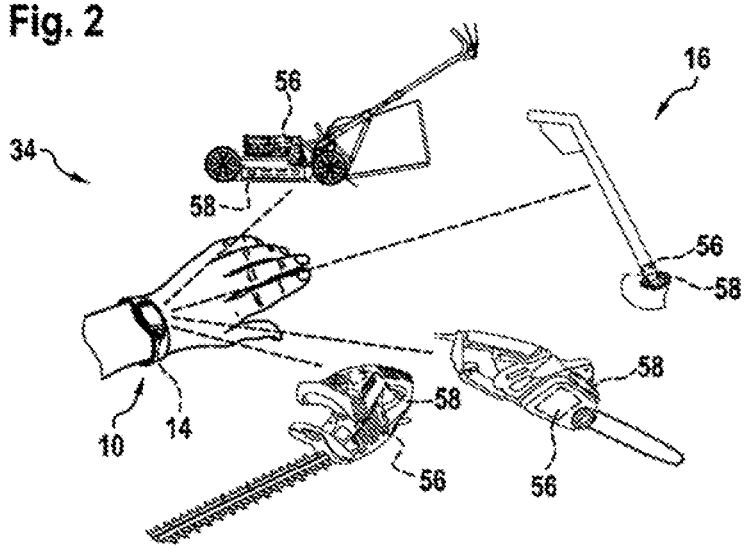
Figure 3:
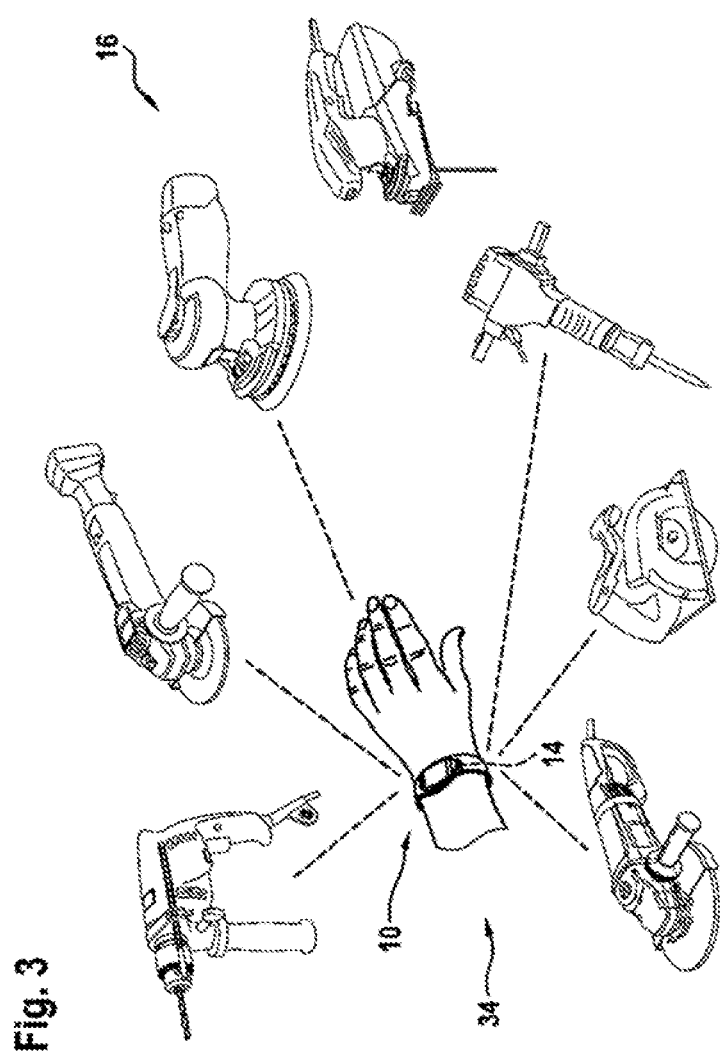

FIG. 2 shows a system 34, comprising at least one mobile function device 10, and comprising at least one external unit 16, which has at least one safety and/or convenience function that can be controlled by open-loop and/or closed loop control in dependence on electronic data that can be transmitted to the external unit 16 by means of the communication unit 14 of the mobile function device 10. Represented in FIG. 2 are a plurality of external units 16, which are designed to communicate with the mobile function device 10. The external units 16 represented in FIG. 2 are realized as power tools, such as, for example, as a hedge trimmer, as a power saw, as a lawn trimmer, as a lawnmower, or the like. For the purpose of communicating with the communication unit 14 of the mobile function device 10, the external units 16 realized as a power tool each comprise at least one counter-communication unit 56, which is realized so as to correspond to the communication unit 14 of the mobile function device 10, at least in respect of a data transmission method. By means of a combined action of the counter-communication unit 56 and the communication unit 14, sensed characteristic quantities can be transmitted between the mobile function device 10 and the external units 16. Further examples for a design of an external unit 16, realized as a power tool, are represented in FIG. 3. The external units 16 represented in FIG. 3 are realized as a power drill, as a battery-operated angle grinder, as a battery-operated random orbital sander, as an orbital sander, as a demolition hammer, as a circular saw, as an angle grinder. The mobile function device 10 communicates with the external units 16, 18 by means of the communication unit 14. Electronic data, for example, for controlling the external units 16, 18 by open-loop and/or closed loop control, which can be transmitted to the external units 16, 18 by means of the communication unit 14, can be generated by means of the computing unit 20 by evaluation of at least one emission characteristic quantity and/or position-specific characteristic quantity, sensed by means of the sensor unit 12.

Figure 4:
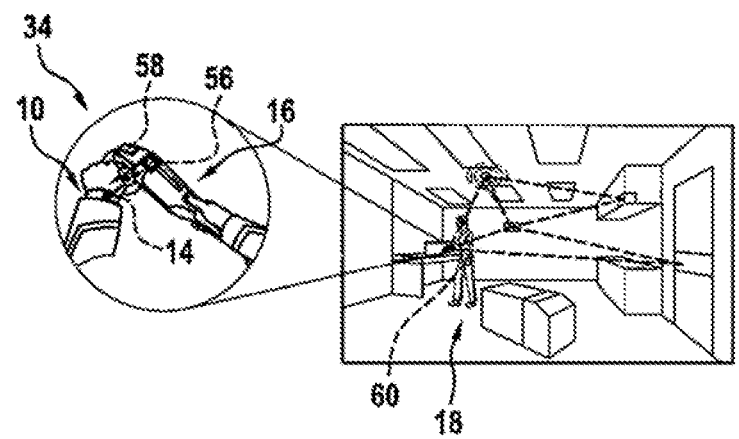

Shown exemplarily in FIG. 4 is a case of application of the mobile function device 10. Two external units 16, 18 are represented in FIG. 4, one realized as a portable power tool, in particular as an angle grinder, and one realized as an item of safety clothing. Emission characteristic quantities, in particular, such as sound emissions, vibration emissions (dust, sparks, etc.) or the like can be sensed by means of the at least one sensor unit 12. Owing to the mobile function device 10 being disposed on an extremity, in particular on an arm, of an operator, and owing to a holding of the external unit 16, realized as a portable power tool, in particular as an angle grinder, the emission characteristic quantities can preferably be sensed advantageously close to a point of origin of the emission characteristic quantities. The communication unit 14 is designed, in particular, to communicate with the external unit 16 realized as a portable power tool, in particular as an angle grinder, and with the further external unit 18 realized as an item of safety clothing, in particular with the respective counter-communication unit 56 of the external units 16, 18. It is advantageously possible to achieve a data fusion of characteristic quantities that can be sensed by means of the sensor unit 12 of the mobile function device 10 and of characteristic quantities that can be sensed by means of a respective sensor unit 58, 60 of the external units 16, 18. Functionalities, operating parameters, protection parameters of the external units 16, 18 can preferably be adapted by means of the computing unit 20 as a result of a communication between the mobile function device 10 and the external unit 16, 18 and/or the external units 16, 18. It is conceivable for at least one noise damping function of an item of safety clothing, realized as a headset or as ear protection, to be adapted for the purpose of selectively damping noises of the portable power tool. If, for example, there is little selective damping of noises from an application with the portable power tool, it can advantageously be ensured that an operator can perceive the noises caused by him and can react accordingly in the case of peculiarities. It is likewise conceivable for an active protective element of an item of safety clothing, realized as a cut protection, to be adapted, or for the latter to be stiffened. It is also conceivable for a suction extraction system to be activated in the space, in the environment or in/on the portable power tool, in order to reduce a measured emission of particles/dust in the air. Moreover, it is conceivable, for example, for a kick-back function of the portable power tool to be controllable by open-loop and/or closed loop control or the like on the basis of vibration emissions.

Furthermore, it is conceivable that, by means of a position-specific characteristic quantity realized as an orientation of the mobile function device 10, it is possible to deduce, in particular as a result of an evaluation of the position-specific characteristic quantity by means of the computing unit 20, what type of portable power tool is being held by an operator. If, for example, a portable power tool realized as an angle grinder is being held over the head, this can be identified by an evaluation of at least one position-specific characteristic quantity, in particular taking account of a data fusion of sensed characteristic quantities of the mobile function device 10 and of the external unit 16, 18. If the appliance is operated over the head, a noise emission is particularly close to an ear of the operator, such that a noise damping can be set to high. Moreover, it is conceivable that, during machining work, toxic gases are produced, which can be sensed by means of the sensor unit 12, in which case an operator can be warned by means of the output unit 30 and/or the portable power tool can be deactivated. In addition, it is conceivable that, in the case of working over the head, it can be identified that an operator is coming into contact with a large quantity of dust/debris in the region of the respiratory tracts. As a result of an evaluation by the computing unit 20, an operator can be informed, for example, by means of the output unit 30, that mouth protection or the like is appropriate for these tasks.

According to a method for controlling a safety and/or convenience function of an external unit 16, 18 by open-loop and/or closed loop control by means of a system 34, an evaluation of at least one sensed emission characteristic quantity and/or of at least one sensed position-specific characteristic quantity is effected in at least one method step, as described exemplarily in the preceding paragraph. In respect of further method steps of the method for controlling a safety and/or convenience function of an external unit 16, 18 by open-loop and/or closed loop control by means of a system 34, reference may be made to the rest of the description of the system 34 and/or of the mobile function device 10, since this description is to be construed as also analogous for the method, and consequently all features in respect of the system 34 and/or the mobile function device 10 are also deemed as disclosed with regard to the method for controlling a safety and/or convenience function of an external unit 16, 18 by open-loop and/or closed loop control by means of a system 34.

Figure 5:
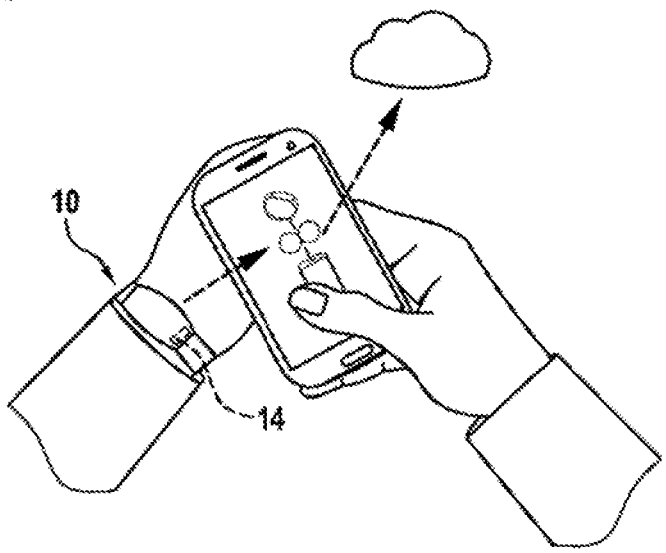

A communication between the mobile function device 10 and an external unit, realized as a smartphone, is shown exemplarily in FIG. 5. As a result of a communication between the mobile function device 10 and an external unit realized as a smartphone, electronic data, for example, which are stored in the storage means 40 of the computing unit 20 of the mobile function device 10, can be transmitted to a cloud via the external unit realized as a smartphone. Advantageously, securing of data can be achieved, or the electronic data can be processed further by further units or devices, via the cloud. Moreover, it is conceivable that sensed emission characteristic quantities and/or sensed position-specific characteristic quantities are stored and/or evaluated in a network/cloud. For example, products for reducing operator burden can be issued in dependence on processed emission characteristic quantities and/or position-specific characteristic quantities, in particular by means of the output unit 30, following a communication of the mobile function device 10 and the cloud. It is conceivable that, for the purpose of uniform distribution of expected operator burdens, a history stored in the cloud is taken into account, and an operator, for example after working with a high vibration burden, is assigned an activity in which there is a lesser vibration burden. Further combinations and/or application possibilities, considered appropriate by persons skilled in the art, are likewise conceivable.

What is claimed is:

1. A mobile tool-system function device that is worn on an extremity of an operator, comprising:
   a band configured to be worn on a wrist of the operator, the band including:
      at least one sensor unit configured to output sensor data indicative of at least one emission characteristic quantity and/or at least one position-specific characteristic quantity;
      at least one communication unit configured to transmit signals to and receive signals from a plurality of external units of different types; and
      at least one computing unit configured to generate control signals configured to control at least a first external unit of the plurality of external units by open-loop and/or closed-loop control,
   wherein the signals received from the plurality of external units include external sensor data generated by a sensor of at least a second external unit of the plurality of external units,
   wherein the computing unit is configured to generate the control signals in dependence on the sensor data output by the at least one sensor unit of the band and in dependence on the external sensor data generated by the sensor of the second external unit of the plurality of external units,
   wherein the at least one communication unit is configured to transmit the generated control signals to the first external unit,
   wherein the at least one sensor unit includes at least one vibration sensor element configured to sense the at least one emission characteristic quantity as a vibration for processing by the at least one computing unit to generate electronic safety setting data configured to control at least one safety function of the first external unit by open-loop and/or closed-loop control, and
   wherein the at least one sensor unit includes at least one sound sensor element configured to sense the at least one emission characteristic quantity as a sound for processing by the at least one computing unit.

2. The mobile function device according to claim 1, wherein the at least one sensor unit includes at least one sensor element configured to sense the at least one emission characteristic quantity as sparks and/or particles for processing by the at least one computing unit.

3. The mobile function device according to claim 1, wherein the at least one sensor unit has at least one position sensor element configured to sense the at least one position-specific characteristic quantity as an orientation for processing by the at least one communication unit.

4. The mobile function device according to claim 1, comprising:
   at least one output unit configured to output at least one signal in dependence on the electronic data generated by the at least one computing unit.

5. The mobile function device according to claim 4, wherein the at least one signal is a haptic, optical, and/or acoustic signal.

6. The mobile function device according to claim 1, further comprising:
   at least one fastening unit configured to fasten the at least one sensor unit to an extremity of an operator.

7. The mobile function device according to claim 1, wherein the first external unit is a portable power tool or an item of safety clothing.

8. A safety system, comprising:
   at least one external unit; and
   a band configured to be worn on a wrist of the operator, the band including:
      at least one mobile function device including
         at least one sensor unit configured to output sensor data indicative of at least one emission characteristic quantity and/or at least one position-specific characteristic quantity;
         at least one communication unit configured to transmit signals to and receive signals from a plurality of external units of different types; and
         at least one computing unit configured to generate control signals configured to control at least a first external unit of the plurality of external units by open-loop and/or closed-loop control,
      wherein the signals received from the plurality of external units include external sensor data generated by a sensor of at least a second external unit of the plurality of external units,
      wherein the computing unit is configured to generate the control signals in dependence on the sensor data output the by at least one sensor unit of the band and in dependence on the external sensor data generated by the sensor of the second external unit of the plurality of external units, wherein the at least one communication unit is configured to transmit the generated control signals to the first external unit, wherein the first external unit includes at least one safety and/or convenience function configured for control by open-loop and/or closed loop control in dependence on the control signals transmitted to the first external unit by the at least one communication unit, wherein the at least one sensor unit includes at least one vibration sensor element configured to sense the at least one emission characteristic quantity as a vibration for processing by the at least one computing unit to generate electronic safety setting data configured to control at least one safety function of the first external unit by open-loop and/or closed-loop control.

9. The safety system according to claim 8, wherein the first external unit includes a portable power tool or an item of safety clothing.

10. The safety system according to claim 8, wherein the safety and/or the convenience function of the first external unit is controlled by open-loop and/or closed loop control through an evaluation of the at least one sensed emission characteristic quantity and/or of the at least one sensed position-specific characteristic quantity.

* * * * *